United States Patent [19]

Foster

[11] Patent Number: 5,010,290

[45] Date of Patent: Apr. 23, 1991

[54] EASILY INSTALLED WHEEL BEARING SENSOR PACKAGE

[75] Inventor: David A. Foster, Castalia, Ohio

[73] Assignee: General Motors Corporation, Detroit, Mich.

[21] Appl. No.: 554,484

[22] Filed: Jul. 19, 1990

[51] Int. Cl.$^5$ ............................ G01P 3/44; G01B 7/30
[52] U.S. Cl. ................................ 324/173; 324/207.22
[58] Field of Search .............. 324/160, 173, 174, 175, 324/207.14, 207.15, 207.16, 207.20, 207.21, 207.22, 207.25, 226, 262; 384/448; 310/155, 168; 336/45, 65

[56] References Cited

U.S. PATENT DOCUMENTS

| | | | |
|---|---|---|---|
| 3,960,248 | 6/1976 | Tribe | 324/174 X |
| 4,027,753 | 6/1977 | Lantz | 324/174 X |
| 4,158,172 | 6/1979 | Boyer et al. | 324/175 X |
| 4,529,933 | 7/1985 | Bleeke | 324/173 |
| 4,667,156 | 5/1987 | Machino et al. | 324/173 |
| 4,689,557 | 8/1987 | Smith et al. | 324/174 |

*Primary Examiner*—Kenneth Wieder
*Assistant Examiner*—Warren S. Edmonds
*Attorney, Agent, or Firm*—Patrick M. Griffin

[57] ABSTRACT

A sensor ring and seal casing for a wheel speed sensor are maintained as a unit handled package by a specially designed shipping and installation jig, which protects the components before they are installed, and which maintains the components in the proper orientation to be installed.

3 Claims, 2 Drawing Sheets

EASILY INSTALLED WHEEL BEARING SENSOR PACKAGE

This invention relates to wheel speed sensing in general, and especially to a sensor package that can be easily handled and installed over the outside of a wheel bearing.

BACKGROUND OF THE INVENTION

Wheel speed sensors have received increasing attention with the renewed interest in antilock braking systems. Almost all wheel speed sensors incorporate a sensor ring, often a toothed steel ring, that turns one-to-one with the wheel, and a pickup sensor facing the toothed ring. The pickup sensor is generally mounted stationary relative to the vehicle, since it has lead wires. Exactly where to mount the rotating sensor ring and the stationary sensor is a matter of design choice. The sensor ring may be mounted to a shaft that turns one-to-one with the wheel, and the sensor hung on a bracket fixed to the vehicle body. Such a system is generally not sealed from the environment. The vehicle wheel is always associated with a rolling bearing, which has one race that rotates at wheel speed and one that is stationary. Such a bearing may be part of the differential, or may be the bearing that directly mounts the wheel to the vehicle. Such bearings also generally have a sealed and protected interior annular space between the races, which contains the rolling bearing elements and their lubricant. When that annular space is large enough, one obvious expedient is to mount the sensor ring to the rotating race inside the sealed annular space, while inserting the sensor through the stationary race, or through a seal that is fixed to the stationary race. Thus, the sensor ring and sensor are sealed from the environment. The sensor may be made removable for easy post installation servicing, if desired. One such design is disclosed in USPN 3,719,841 to Ritsema.

A drawback of mounting components inside the bearing space is that removal of a component necessarily breaks the seal and exposes the bearing interior space to the environment, however briefly. Thus, wheel speed sensing has also been provided by mounting the components to the outside of the bearing. An extra seal or seals are provided to create a separate, dedicated sealed space for the sensor and sensor ring. One drawback of the exterior mounted approach is the extra expense involved in providing the extra seals necessary. However, the extra seal does keep bearing lubricant away from the sensor components, and allows the sensor to be pulled out without exposing the bearing to the environment. A more practical drawback is that the sensor components and extra seal may have to be shipped, handled and installed piecemeal to the bearing. An example of such an exterior mounted system with multiple components is disclosed in USPN 3,772,549 to Cumming.

SUMMARY OF THE INVENTION

The invention provides an exterior mounted system in which the sensor ring and seal are incorporated into a unit handled package that can be easily assembled and installed over a bearing.

The preferred embodiment of the invention is used with a double row ball bearing in which the outer race is generally cylindrical and stationary relative to the vehicle. The rotating, coaxial inner race protrudes beyond the outer race, axially outboard of the annular space between the races, and presents a radially outwardly facing cylindrical surface. The inner race's cylindrical surface is contiguous to an axially outwardly facing annular edge, which is located radially inboard thereof.

The sensor package includes three basic components, a casing, a sensor ring, and a shipping and installation jig that maintains the ring and casing together as a unit. The sensor ring is generally annular, with a radially inwardly facing cylindrical mounting surface that closely matches the cylindrical surface of the bearing inner race. The ring mounting surface is contiguous to an axially inwardly facing annular groove located radially outboard thereof. The outside of the sensor ring has a magnetic portion comprising an array of teeth and a cylindrical seal surface that is outboard of the teeth, coaxial to the ring mounting surface. The casing is a steel stamping with a stepped cylindrical shape designed to press fit tightly over the outside of the outer race. An elastomer seal is molded to the casing at the correct diameter to engage the sensor ring seal surface. The jig, which is a molded plastic part, has an outer cylindrical shell pressed tightly over the outside of the casing and a coaxial, inner cylindrical shell fitted slidably over the sensor ring mounting surface. A lip at the end of the inner shell snaps into the sensor ring groove. The shells are joined by an annular rim that is molded between them at a pair of coaxial, circular live hinge lines. This allows the inner shell to shift axially outwardly relative to the outer shell as the inner and outer shells remain coaxial. The jig holds the casing and ring together coaxial, with enough security that they may be shipped and handled as a package unit. In addition, in the embodiment disclosed, a probe type sensor is inserted through the casing over the sensor ring, and its wire lead is retained in a central sleeve of the jig.

The package provided may be installed easily over the bearing, since the components are retained together in the proper orientation for installation. By applying a simultaneous axial pressing force to the casing and sensor ring, the casing is pushed over the outer race as the sensor ring moves toward the protrusion on the inner race. Because of the relative size and orientation of the inner race, sensor ring and jig, the lip of the jig's inner shell abuts the inner race's annular edge, which pushes it out of the annular groove. This shifts the inner shell axially outwardly, off of the sensor ring, as the sensor ring's mounting surface slides axially over the cylindrical surface of the inner race. Simultaneously, the casing pushes tightly over the outside of the outer race. Finally, the outer shell can be pulled off of the outside of the casing, and the sensor lead pulled out of the sleeve. The final result is that the casing and sensor ring are installed to the outer and inner race respectively, creating a separate sealed space outside of the bearing interior space. The teeth of the sensor ring and the end of the sensor are protected within the separate sealed space.

It is, therefore, an object of the invention to provide a self contained sensor package that can be easily shipped, handled and installed to the outside of a bearing.

It is another object of the invention to provide such a unit handled package by holding an annular sensor ring and casing together with a shipping and installation jig specially designed to keep the parts securely and properly oriented before installation, but to slide off easily as the parts are installed to the bearing.

It is another object of the invention to provide such a jig that is molded from plastic with a pair of coaxial cylindrical shells held together by an annular rim at a pair of circular hinge lines, so that the inner shell can be kicked off of the sensor ring and shifted axially out as the sensor ring slides into place.

DESCRIPTION OF THE PREFERRED EMBODIMENT

These and other objects and features of the invention will appear from the following written description, and from the drawings, in which.

Figure 4:
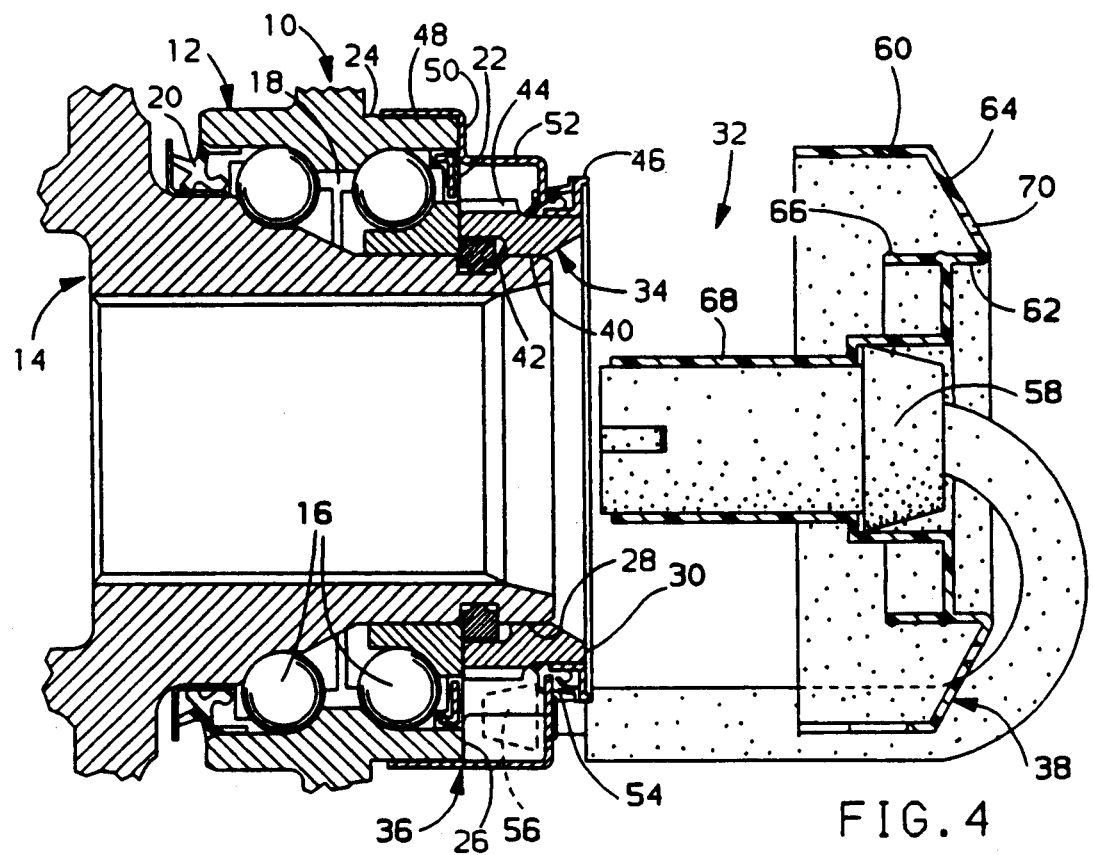

FIG. 4 a similar view after the jig has been pulled off.

Figure 1:
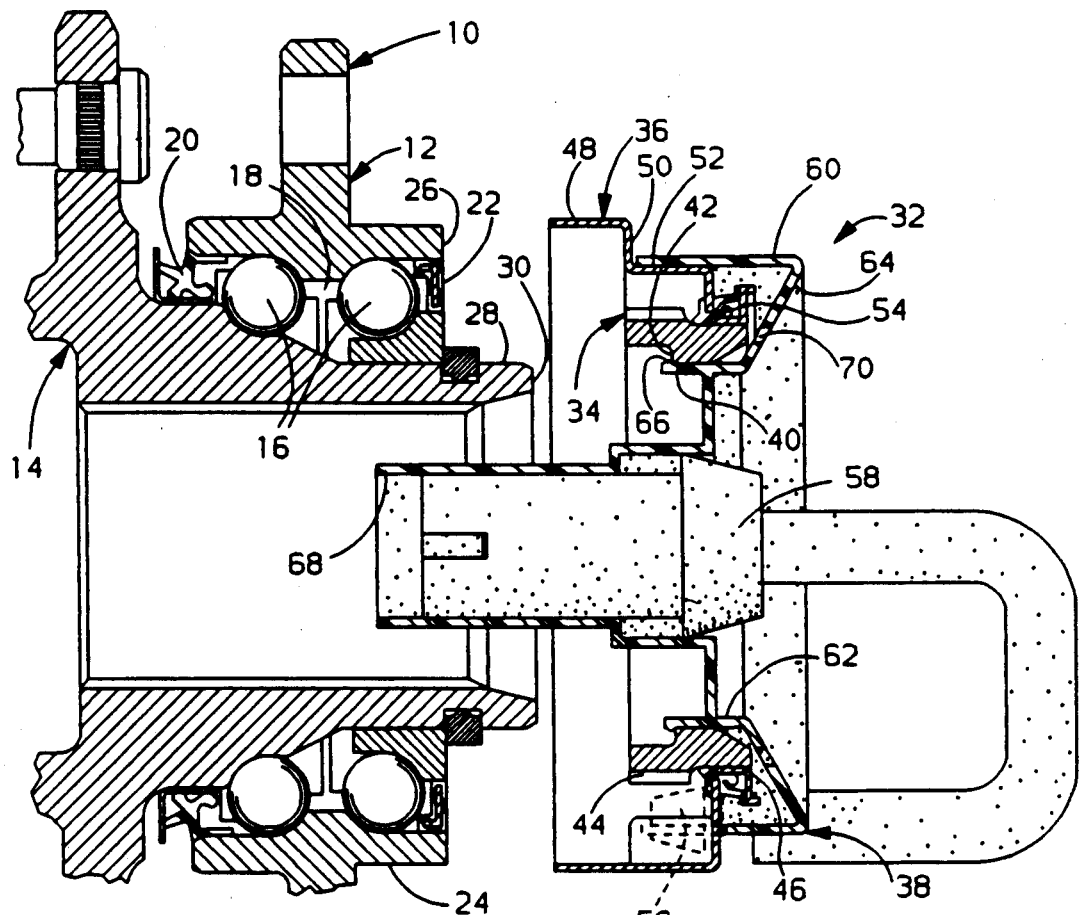
FIG. 1 is a cross section of a bearing and preferred embodiment of the sensor package of the invention axially aligned, before installation.

Referring first to FIG. 1, the invention is designed to be installed to a vehicle wheel bearing, indicated generally at 10. Bearing 10 has an outer race, indicated generally at 12, and an inner race, indicated generally at 14. Outer race 12 is stationary, secured to the vehicle frame. Inner race 14 mounts the vehicle wheel, and so rotates at wheel speed. The races 12 and 14 are maintained coaxial by a double row of bearing balls 16, thereby creating a generally annular interior space 18. Interior space 18 is sealed and bounded by a conventional inboard seal 20 and outboard seal 22, which keep outside contaminants out of space 18, and seal in a supply of lubricant, not illustrated. Outer race 12 has an outside cylindrical surface 24 contiguous to an axially outwardly facing annular edge 26, which is basically coplanar to the outboard bearing seal 22. While outer race 12 ends at the bearing seals 20 and 22, inner race 14 protrudes farther, axially beyond the interior space 18. Specifically, on the axial outboard side, inner race 14 presents a radially outwardly facing cylindrical surface 28 contiguous to an axially outwardly facing annular edge 30, which is radially inboard of surface 28. Thus, annular edge 30 constitutes the axial outermost surface of bearing 10. The orientation and shape of the various surfaces of races 12 and 14 described are used to advantage in the design and installation of the invention, described next.

Still referring to FIG. 1, a preferred embodiment of the sensor package of the invention is indicated generally at 32. Package 32 includes three basic components, a sintered steel annular sensor ring, indicated generally at 34, a stamped steel casing, indicated generally at 36, and a molded plastic shipping and installation jig, indicated generally at 38. Sensor ring 34 has an inner surface comprised of a cylindrical mounting surface 40, which substantially matches the diameter of the inner race cylindrical surface 28, and a contiguous, axially inwardly facing annular groove 42, which is located radially outboard of mounting surface 40. The outer surface of sensor ring 34 is comprised of a circular array of teeth 44 located next to a cylindrical seal surface, specifically a liner 46. Casing 36 has a stepped cylindrical shape, including an outer cylindrical wall 48, an intermediate annular wall 50, and an inner cylindrical wall 52. The diameter of casing outer wall 48 tightly matches that of outer race cylindrical surface 24. A rubber lip seal 54 is molded to inner wall 52, with a diameter matching liner 46. In addition, in the embodiment disclosed, the casing outer wall 48 is bulged out locally to accommodate a probe type speed sensor 56, from which a plug assembly 58 extends.

Referring next to FIGS. 1 and 4, jig 38 has the general shape of a circular trough, with an outer cylindrical shell 60, a coaxial inner cylindrical shell 62, and an annular rim 64 that is integrally molded between the two shells 60 and 62. Inner shell 62 has a diameter equal to sensor ring mounting surface 40, while outer shell 60 has a diameter equal to or just slightly less than casing inner wall 52. In addition, inner shell 62 has an upturned lip 66 at the edge, and a central sleeve 68. Rim 64 is also pierced by several access holes, one of which is shown at 70, which are concentric to sensor ring 34. These dimensions allow outer shell 60 to fit very tightly over casing inner wall 52, while inner shell 62 fits closely inside sensor ring mounting surface 40, with lip 66 snapped into groove 42. In the pre-installation position of FIG. 1, rim 64 slopes axially inwardly, since lip 66 is significantly inboard of outer shell 60. Plug assembly 58 is pushed into, and supported and protected by, central sleeve 68. The net effect is that all components are maintained securely together in coaxial relation. Package 32 can thus be shipped, handled and carried as a unit. Casing seal 54 is maintained against liner 46, but will not rattle significantly, and is also protected by being covered by rim 64.

Figure 2:
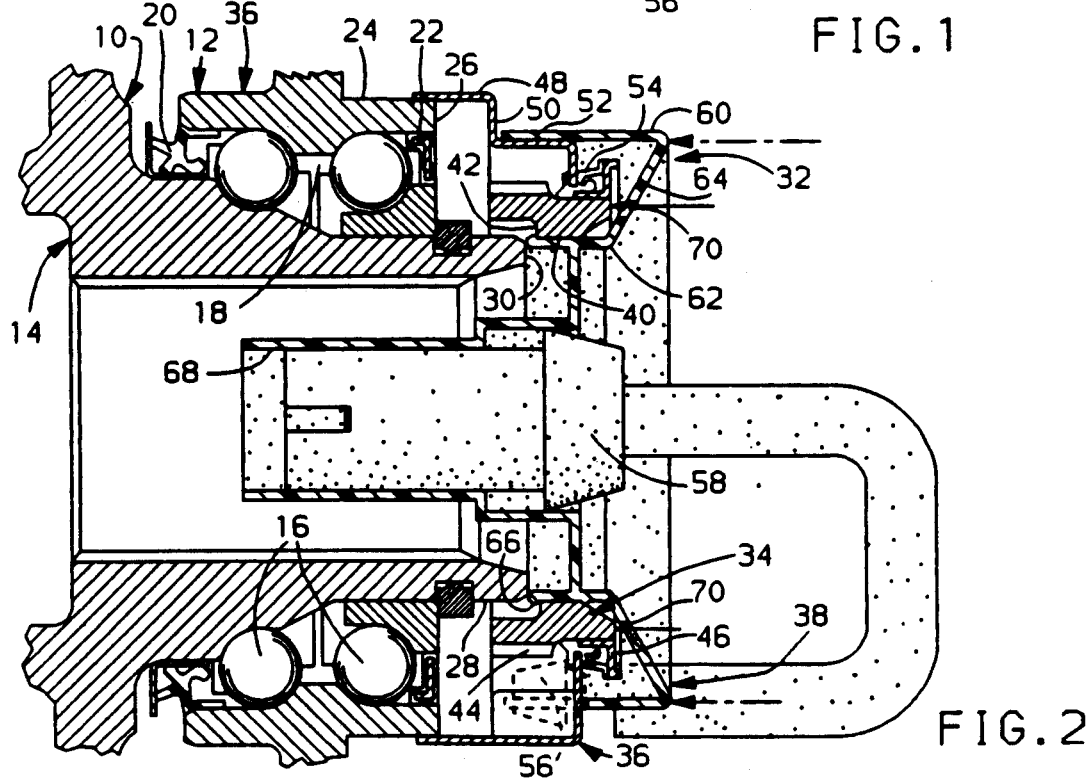
FIG. 2 is a similar view showing the package beginning to make contact with the bearing, during installation.
Figure 3:
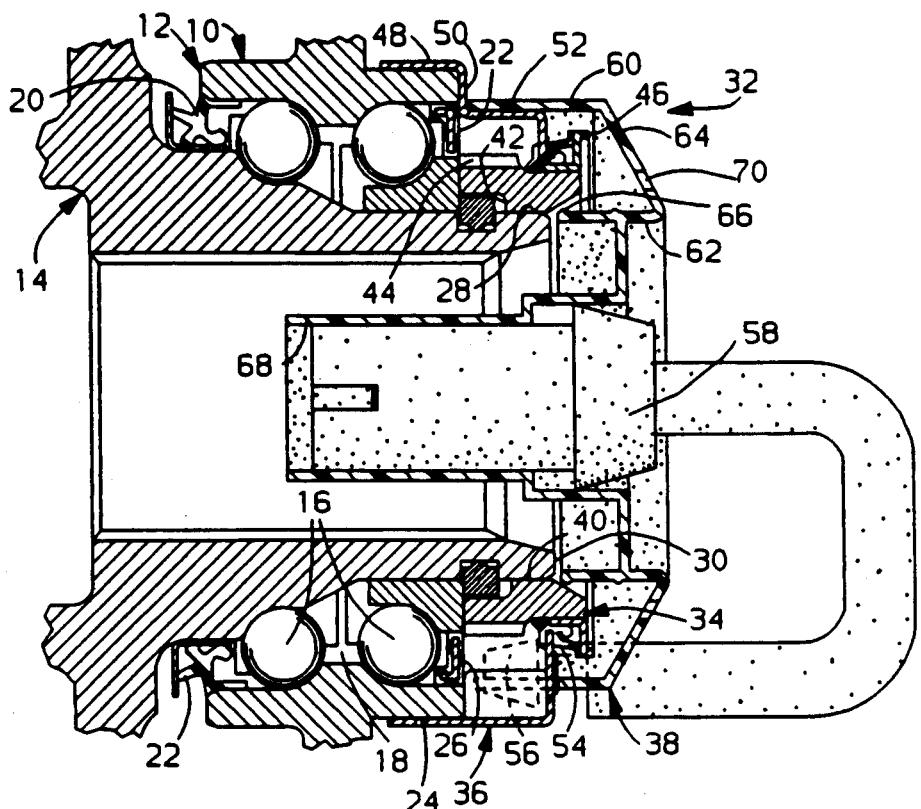
FIG. 3 is a similar view after the sensor ring and casing are in place, but before the jig has been completely away.

Referring next to FIGS. 2 and 3, it may be seen how package 32 allows casing 36 and sensor ring 34 to be installed. By simultaneously applying an axial push to the casing annular wall 50 and to sensor ring 34, (through the access holes 70) package 32 is moved axially to the left, toward bearing 10. This axial force, shown by the arrows in FIGS. 2, would be applied evenly around the circumference of the components by any suitable tool or ram. The same tool would also contact the circular line juncture of outer shell 60 and rim 64, as shown by the dotted arrow in such a way as to provide support, but not a significant pushing force. The casing outer wall 48 begins to move over outer race cylindrical surface 24, since their diameters match. At the same time, lip 66 abuts inner race annular edge 30, by virtue of their relative dimensions. Since an inward axial force is being applied to sensor ring 34, the effect is to push lip 66 out of groove 42, and slide inner shell 62 off of sensor ring mounting surface 40. As this happens, inner shell 62 moves axially outwardly, to the right, and rim 64 shifts to a post installation position where it slopes in the other direction, as shown in FIG. 3. The live hinge lines referred to above allow this shifting to occur without breaking jig 38. Eventually, when casing annular wall 50 abuts outer race annular edge 26 and sensor ring 34 can be pushed no farther onto inner race 14, the pushing force is ended. Casing 36 and sensor ring 34 are now fully installed, but jig 38 is left in place temporarily to protect plug assembly 58 and seal 54.

Referring next to FIG. 4, installation is completed by pulling shell 60 off of casing 36. Jig 38 could be left on plug assembly 58 to protect it, but it is likely that plug assembly 58 would be attached to another wire, not illustrated, almost immediately. Jig 38 would not be damaged by removal, and could be re-used so long as its hinge lines maintained resiliency. Post installation, the sensor ring teeth 44, and the end of sensor 56, are protected in their own sealed space, independent of bearing interior space 18. During operation of bearing 10, sensor ring 34 turns with inner race 14, registering the wheel speed read by sensor 56, while casing seal 54 rubs on liner 46. Material from bearing interior space 18 cannot directly migrate to the space between outboard bearing seal 22 and casing seal 54, nor vice versa. Nor would removal of sensor 56 expose bearing space 18 to the environment. Thus, all the advantages of an exterior mounted system are provided in a package 32 that can be easily handled and installed as a unit.

Variations could be made in the embodiment disclosed. Sensor 56 and plug assembly 58 need not be provided as an integral part of package 32. Since sensor 56 can sit anywhere over teeth 44 in the circumferential sense, a pre-punched hole could be provided in casing 36, and sensor 56 could be added after the installation of casing 36 and sensor ring 34. However, the particular embodiment shown, with its central sleeve 68, makes it particularly advantageous to add sensor 56 to the package 32 first, especially since both sleeve 68 and plug assembly 58 are protected inside the inner race 14 after installation. If bearing 10 were assembled close to the time that package 32 was to be installed, then it would be possible to use casing outer cylindrical wall 48 and annular wall 50 as a secondary jig, in effect, to install bearing outboard seal 22. That is, casing 36 could be used to carry a bearing seal like 22 into alignment and abutment with outer race annular edge 26, closing off the outboard side of bearing interior space 18. Thus, it will be understood that it is not intended to limit the invention to just the embodiment disclosed.

The embodiments of the invention in which an exclusive property or privilege is claimed are defined as follows:

1. A self contained sensor package adapted to be installed to a bearing, said bearing having a stationary race and coaxial rotating race with an interior annular space between said races maintained by a complement of rolling elements contained within said annular space, said rotating race also having a cylindrical surface located outside of said annular space, said sensor package comprising,
   a generally annular sensor ring having a cylindrical mounting surface sized so as to slide closely axially over said rotating race cylindrical surface, said sensor ring also having a magnetic portion, and a rubbing seal surface coaxial to said mounting surface located axially outboard of said magnetic portion,
   a generally cylindrical casing adapted to be press fitted axially over said stationary race,
   a seal secured to said casing and adapted to sealingly engage said sensor ring seal surface when said sensor ring and casing are maintained coaxial to one another, and,
   a shipping and installation jig maintaining said sensor ring and casing in coaxial relation as a package, said jig including a first cylindrical shell press fitted tightly over the outside of said casing, a coaxial, second cylindrical shell fitted slidably over said sensor ring mounting surface, and an annular rim interconnecting said first and second shells at coaxial, circular hinge lines, so that said second shell may shift axially outwardly relative to said first shell while said first and second shells remain coaxial,
   whereby said package may be installed to said bearing by sliding said casing axially over the outside of said stationary race as said sensor ring mounting surface simultaneously slides axially over said rotating race cylindrical surface, thereby pushing said jig second cylindrical shell off of said sensor ring and shifting it axially outboard of said first shell, after which said first shell may be removed from said casing, leaving said casing and sensor ring installed to said bearing axially outboard of said annular bearing space, with said sensor ring magnetic portion protected within said casing by said casing seal.

2. A self contained sensor package adapted to be installed to a bearing, said bearing having a stationary outer race and coaxial rotating inner race with an interior annular space between said races maintained by a complement of rolling elements contained within said annular space, said inner race also having a radially outwardly facing cylindrical surface located outside of said annular space and contiguous to an axially outwardly facing annular edge located radially inboard thereof, said sensor package comprising,
   a generally annular sensor ring having a radially inwardly facing cylindrical mounting surface sized so as to slide closely axially over said inner race cylindrical surface and contiguous to an axially inwardly facing annular groove located radially outboard thereof, said sensor ring also having a magnetic portion, and a rubbing seal surface coaxial to said mounting surface located axially outboard of said magnetic portion,
   a generally cylindrical casing adapted to be press fitted axially over said outer race,
   a seal secured to said casing and adapted to sealingly engage said sensor ring seal surface when said sensor ring and casing are maintained coaxial to one another, and,
   a shipping and installation jig maintaining said sensor ring and casing in coaxial relation as a package, said jig including an outer cylindrical shell press fitted tightly over the outside of said casing, a coaxial, inner cylindrical shell fitted slidably over said sensor ring mounting surface and also having a lip snap fitted into said sensor ring groove, and an annular rim interconnecting said inner and outer cylindrical shells at coaxial, circular hinge lines, so that said inner shell may shift axially outwardly relative to said outer shell while said inner and outer shells remain coaxial,
   whereby said package may be installed to said bearing by sliding said casing axially over the outside of said stationary race as said lip simultaneously abuts said inner race annular edge, thereby snapping said lip out of said sensor ring groove and pushing said inner shell axially off of said sensor ring mounting surface as said mounting surface slides axially over said inner race cylindrical surface and said inner shell is shifted axially outboard of said outer shell, after which said outer shell may be removed from said casing, leaving said casing and sensor ring installed to said bearing axially outboard of said annular bearing space, with said sensor ring magnetic portion protected within said casing by said casing seal.

3. A self contained sensor package adapted to be installed to a bearing, said bearing having a stationary outer race and coaxial rotating inner race with an interior annular space between said races maintained by complement of rolling elements contained within said annular space, said inner race also having a radially outwardly facing cylindrical surface located outside of said annular space and contiguous to an axially outwardly facing annular edge located radially inboard thereof, said sensor package comprising,

- a generally annular sensor ring having a radially inwardly facing cylindrical mounting surface sized so as to slide closely axially over said inner race cylindrical surface and contiguous to an axially inwardly facing annular groove located radially outboard thereof, said sensor ring also having a magnetic portion, and a rubbing seal surface coaxial to said mounting surface located axially outboard of said magnetic portion,
- a generally cylindrical casing having a cylindrical outer wall adapted to be press fitted axially over said outer race, and an annular wall,
- a seal secured to said casing and adapted to sealingly engage said sensor ring seal surface when said sensor ring and casing are maintained coaxial to one another, and,
- a shipping and installation jig maintaining said sensor ring and casing in coaxial relation as a package, said jig including an outer cylindrical shell press fitted tightly over the outside of said casing, a coaxial, inner cylindrical shell fitted slidably over said sensor ring mounting surface and also having a lip snap fitted into said sensor ring groove, and an annular rim interconnecting said inner and outer cylindrical shells at coaxial, circular hinge lines, so that said inner shell may shift axially outwardly relative to said outer shell while said inner and outer shells remain coaxial, said rim also having a plurality of access holes therein, whereby said package may be installed to said bearing by applying an axial force to said casing annular wall and to said sensor ring through said access holes, thereby sliding said casing outer wall axially over the outside of said stationary race as said lip simultaneously abuts said inner race annular edge, thereby snapping said lip out of said sensor ring groove and pushing said inner shell axially off of said sensor ring mounting surface as said mounting surface slides axially over said inner race cylindrical surface and said inner shell is shifted axially outboard of said outer shell, after which said outer shell may be removed from said casing, leaving said casing and sensor ring installed to said bearing axially outboard of said annular bearing space, with said sensor ring magnetic portion protected within said casing by said casing seal.

* * * * *